United States Patent
Machledt

[19]

[11] Patent Number: 6,016,828
[45] Date of Patent: Jan. 25, 2000

[54] VAULT VENT HAVING DUAL BALL WATER SEAL

[76] Inventor: Charles G. Machledt, 6306 Winding Brook Dr., New Port Richey, Fla. 34655

[21] Appl. No.: 09/225,241

[22] Filed: Jan. 4, 1999

[51] Int. Cl.[7] ..................................................... F16T 1/20
[52] U.S. Cl. ............................ 137/202; 52/132; 137/338; 137/433
[58] Field of Search ..................... 52/131, 132; 137/192, 137/202, 388, 433

[56] References Cited

U.S. PATENT DOCUMENTS

| | | | |
|---|---|---|---|
| 924,641 | 6/1909 | Crispin | 137/202 |
| 1,698,990 | 1/1929 | Derryberry | 137/202 |
| 2,393,078 | 1/1946 | Wager | 137/388 |
| 2,603,493 | 7/1952 | Rusconi | 137/202 |
| 2,783,523 | 3/1957 | Halley | 52/131 |
| 3,309,225 | 3/1967 | Couch et al. | 428/48.6 |
| 3,420,943 | 1/1969 | Short | 174/37 |
| 3,542,059 | 11/1970 | Blanchard et al. | 137/433 |
| 3,620,240 | 11/1971 | Bogdanski | 137/202 |
| 3,759,281 | 9/1973 | Falcuta | 137/433 |
| 4,457,325 | 7/1984 | Green | 137/39 |
| 4,487,215 | 12/1984 | Green | 137/43 |
| 4,524,794 | 6/1985 | Haines | 137/202 |
| 4,630,531 | 12/1986 | Krauss | 137/202 |
| 4,709,120 | 11/1987 | Pearson | 174/16.1 |
| 5,042,519 | 8/1991 | Kerlin | 137/202 |
| 5,115,830 | 5/1992 | Harde | 137/39 |
| 5,409,033 | 4/1995 | Hirayama | 137/202 |

FOREIGN PATENT DOCUMENTS

| | | | |
|---|---|---|---|
| 616602 | 3/1961 | Canada | 137/202 |
| 2012023 | 7/1979 | United Kingdom | 137/202 |

*Primary Examiner*—George L. Walton
*Attorney, Agent, or Firm*—Terrance L. Siemens

[57] ABSTRACT

A vault suitable for underground burial, having a vent capable of passing air into and out of the vault and excluding rising external water from entering the vault through the vent, and a valve assembly for accomplishing this exclusion. The vault has walls enclosing an open interior storage space. The vent has a conduit communicating between the interior space and the outside atmosphere. The valve assembly is located at the free end of the conduit. The valve assembly comprises a vertical, cylindrical chamber having a lower opening open to the atmosphere and an upper opening connected to the conduit. Two spherical floats of unequal diameter are occupy the chamber, with the smaller float located above the larger float. The upper float is a valve cooperating closely with a valve seat located at the upper opening. A grate or screen retains the floats in the chamber. When rising waters threaten to flood the vault, the floats rise, the upper float seating in the seat and closing the upper opening. The lower float increases buoyant force acting on the upper float.

11 Claims, 3 Drawing Sheets

VAULT VENT HAVING DUAL BALL WATER SEAL

REFERENCE TO RELATED APPLICATION

This application is related to my prior application Ser. No. 08/916,950, filed Aug. 25, 1997, now pending.

BACKGROUND OF THE INVENTION

1. Field of the Invention

The present invention relates to valves disposed to prevent entry of liquid into a conduit connected as a vent to a receptacle or vault, and to a receptacle or vault provided with such a valve. The valve enables gases to flow in both direction within the conduit to bring equilibrium to ambient pressures, but prevents flooding of the receptacle or vault.

2. Description of the Prior Art

Electrical equipment is frequently stored in enclosures such as cabinets or vaults so that the equipment is located proximate premises served by the equipment, while enabling the equipment to remain substantially inaccessible to the public. In particular, telephone utility companies store batteries for operating the telephone system. Cabinets and vaults are useful in protecting batteries against animals and human vandals and thieves, but are prone to deleterious influences shortening battery life.

The useful life of batteries is reduced by exposure to elevated temperatures and to water. Battery manufacturers supplying batteries typically specify that the environment of the battery average no higher than 77° F. over time and not to exceed 92° F. at any time. Therefore, it is desirable to limit temperatures within and to deny infiltration of water into any enclosure housing batteries. Water may infiltrate due to flooding resulting from flooding waterways and temporary high water tables.

Water vapor will condense when temperatures cool, and will come to rest on battery surfaces, ceiling surfaces above the batteries, and on battery racks, with eventual drippage onto the batteries. Operation of acid using batteries typically releases hydrogen into the air due to electrolysis of water from the acid. Hydrogen is notoriously combustible, and must be vented to mitigate hazards of fire and explosions. Therefore, it is not feasible to fully seal the enclosure to eliminate infiltration by water. Simultaneously, the enclosure must limit its internal temperature.

Underground vaults for protecting electrical equipment are notoriously old. Representative underground vaults are shown in U.S. Pat. Nos. 3,390,225, issued to Robert O. Couch et al. on Jun. 25, 1968, 3,420,943, issued to Herbert D. Short on Jan. 7, 1969, and 4,709,120, issued to Dean C. Pearson on Nov. 24, 1987, as well as in my prior application identified above.

Vaults may be fully covered by the earth, or may be partially exposed above grade. In either case, they are susceptible to flooding if provided with a vent. A suitable valve is needed to enable air to flow both into the vault from outside, and from the vault to purge oxygen and hydrogen which may evolve from electrolysis of battery fluids, and to purge gases employed to flush the atmosphere of the vault. To properly protect batteries and other sensitive apparatus contained within the vault, the valve must prevent rising water from entering the vault through the vent.

The prior art has proposed venting valves which close under certain specified conditions. U.S. Pat. Nos. 4,487,215, issued to Charles J. Green on Dec. 11, 1994, and 5,042,519, issued to James R. Kerlin on Aug. 27, 1991, both describe fuel tank vent valves having two balls disposed to obstruct flow under certain conditions. However, the lower of the two vertically arrayed balls in both prior art patents are made from materials denser than the liquid they control. By contrast, the two balls of the novel valve are floats. The aforementioned prior art valves would entirely fail to operate as does the novel valve, wherein the lower ball floats, thereby exerting buoyant force acting on the upper ball when liquid enters the valve housing.

U.S. Pat. No. 4,524,794, issued to Frederick K. Haines on Jun. 25, 1985, shows a valve having two vertically arrayed balls. However, in Haines, the balls are obstructed with contact with one another. Also, the lower ball is fixed to a pivotally mounted lever which unseats the lower ball responsive to horizontal flow beneath the valve housing. In the present invention, both balls are free to move about within a common chamber, and normally contact one another both when air flows through the valve housing and also when liquid enters the valve housing. Also the valve housing of Haines opens upwardly to the atmosphere. Such a feature would defeat operation in the present invention.

U.S. Pat. No. 4,457,325, issued to Charles J. Green on Jul. 3, 1984, describes a fuel vent valve having three balls. However, the subject valve of Green has construction radically differing from that of the present invention. Whereas the novel valve has two float balls constrained to move within a limited portion of a conduit associated with the valve, the device of Green includes a valve housing containing two of the three valves. This valve housing is spring biased downwardly. By contrast, there is no spring in the present invention. In Green, none of the balls are themselves valves. Of the two balls in the valve housing in Green, one is of relatively great density, unlike the present invention. Also, the valve of Green has a seal which closes the valve housing regardless of valve position. This seal releases gases responsively to attainment of a predetermined high temperature. The novel valve is always open, and has no second closure corresponding to the seal of Green.

U.S. Pat. Nos. 4,630,531, issued to Werner Krauss on Dec. 23, 1986, and 5,115,830, issued to Bo Harde on May 26, 1992, both illustrate single ball type valves. The present invention has two balls which act in tandem, producing closing acting far more effective than would be provided by only one ball. The valve of Krauss incorporates elements of an associated pneumatic system absent and unnecessary in the present invention. In Harde, the ball is not itself a valve. Instead, it assists the valve in closing under conditions of severe inclination and inversion of the entire device. In the present invention, one of the balls is a valve, and the novel valve apparatus can close the conduit with its associated apparatus in the upright position.

None of the above inventions and patents, taken either singly or in combination, is seen to describe the instant invention as claimed.

SUMMARY OF THE INVENTION

The present invention provides a vent valve particularly suited for vaults intended for underground storage of lead acid and other batteries which must be maintained at limited temperatures and which evolve hydrogen gas during operation. The underground location exploits cool temperatures which prevail even during the summer. These temperatures maintain the batteries at temperatures which will extend the useful life of the batteries. The vault is rendered water tight by the novel vent valve, so that rising water cannot enter the vault despite the usually open valve.

Air pressure is maintained at ambient pressure inside the vault by the novel valve. This requires that air flow be enabled in both directions. Should cooling of the vault lower ambient pressure within the vault, air will enter from outside. Should pressure increase due to drop in ambient air pressure outside the vault, from gases evolving from electrolysis of battery fluids, or should the vault be purged by released compressed gases, as may be performed to dry the internal atmosphere of the vault, air will flow out of the vault.

The novel valve accommodates passage of air in both directions. It further closes the vent conduit should ground water accumulate and rise in the vicinity of the vault. This may occur as a result of flooding of natural waters, excessive rain, ruptured water mains, and other causes. In particular, the novel valve performed successfully in every one of twenty-one total installations in Florida and Louisiana during the spring of 1998, when high rainfall was experienced over a short time. Localized flooding failed to penetrate the vaults protected by the novel valve.

To these ends, the invention comprises a conduit communicating between the interior of a fully or partially buried vault and the outside atmosphere, and a novel valve disposed within the conduit. The valve has a chamber wherein two floatable balls are entrapped. The balls are constrained by configuration of the chamber such that they are vertically stacked relative to one another. The top ball acts as a valve which cooperates with a valve seat formed at the top of the chamber. The lower ball increases buoyant force maintaining the upper ball in its seat, should water rise to the point that it enters the chamber of the valve. The bottom of the chamber is covered by a screen maintaining the balls in the chamber. The valve chamber opens downwardly, so that the scheme employing floating balls will be operable.

The upper ball, or valve, is of diameter greater than half that of the chamber, so that it will not be pinned ineffectually to one side of the chamber by the lower ball when rising water enters the valve chamber. The lower ball is greater in diameter than that of the valve, so that the lower ball, when it floats, more than doubles buoyant force acting on the valve when water rises.

It is preferred that the ball acting as valve and the ball acting as an additional float for increasing buoyant force be spherical because spherical configuration is that least likely to allow a valve to bind within its chamber. Binding, if that occurred to a non-spherical valve, could cause misalignment with the seat, thereby possibly leading to failure to seal. This is most unlikely to happen if the valve is spherical. Also, spherical objects are inexpensive to fabricate.

The lower ball is preferably greater in diameter than that of the upper ball. The buoyant force it would bring to bear on the upper ball would be greater than that of the upper ball. The lower ball therefore more than doubles force acting to hold the valve in place in its seat than would be available from only one valve.

Accordingly, it is one object of the invention to provide a valve suitable for ventilating an underground vault, wherein air can flow selectively in opposing directions, and capable of preventing flooding of the vault from rising external water.

It is another object of the invention that valve be a floating sphere.

It is a further object of the invention that the ball acting as a valve be assisted in developing buoyant force holding the valve closed in the event of rising water entering the valve by an additional float.

Still another object of the invention is that the valve and the additional float both be spherical.

Yet another object of the invention is that the valve and the additional float be permanently entrapped within the valve housing.

Still a further object of the invention is that the additional float more than double buoyant force available to the valve than that provided by only the floating valve itself.

It is still another object of the invention that the valve apparatus be immune from misalignment between the valve and its seat.

An additional object of the invention is to provide a vault having a vent which allows air to enter and leave the vault, the vault being afforded protection from water entering the vault through the vent.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
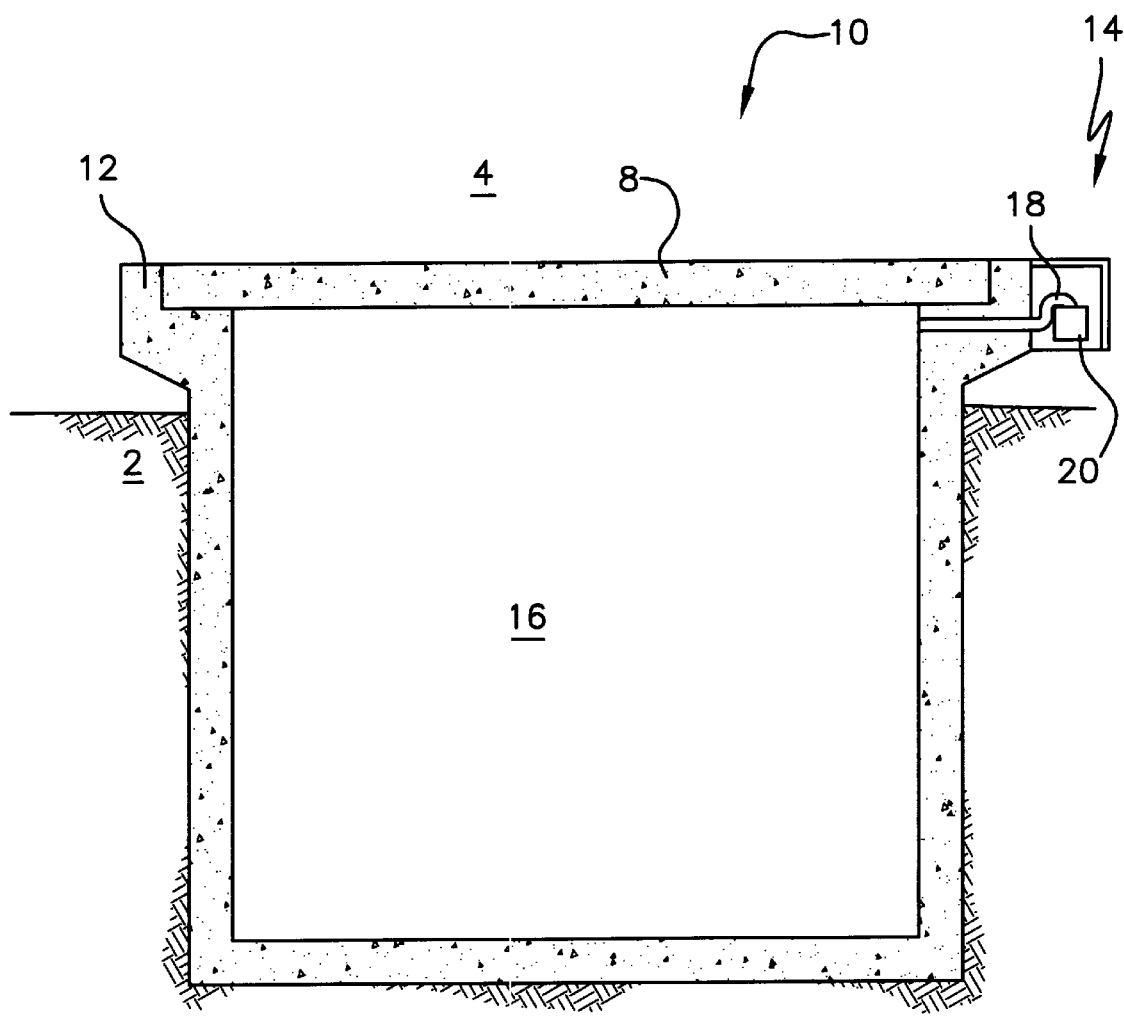
FIG. 1 is an environmental, side elevational view of the invention, shown partially in cross section.

Turning now to FIG. 1 of the drawings, vault 10 is shown buried in the ground 2. Only the top of the vault is exposed to view. Vault 10 is suitable for burial in the ground, comprising a water impervious receptacle 12 for storing batteries or other articles (none shown) and a flood resistant vent 14 venting vault 10 to the open atmosphere 4 above ground 2. Vent 14 will be further described hereinafter. Receptacle 12 encloses an open interior 16 providing usable space occupied by the stored articles. Apart from vent 14, vault 10 may be constructed conventionally for vaults intended for ground burial, and is shown in only representative fashion in FIG. 1, wherein handles for lifting cover 8 and other ancillary components are understood to be provided, but are omitted for brevity. Vault 10 may be generally constructed, for example, in the manner shown in my prior application, Ser. No. 08/916,950, filed Aug. 25, 1997, now U.S. Pat. No. 6,006,944, which is hereby incorporated by reference. Vent 14 comprises a conduit 18 communicating between interior 16 of receptacle 12 and the outside atmosphere. A valve assembly 20 is disposed in flow controlling relation to conduit 18.

Figure 2:
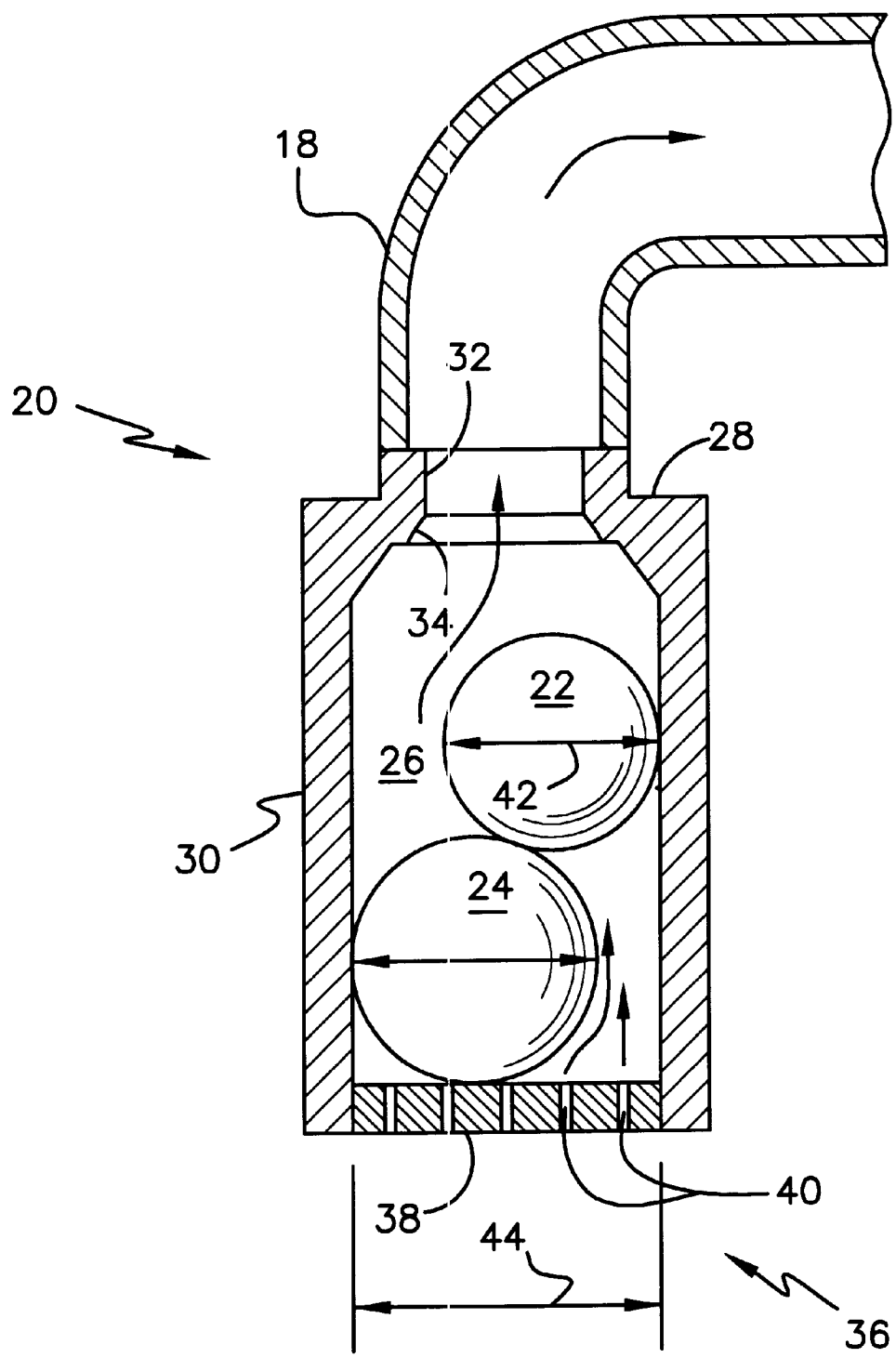
FIG. 2 is a side elevational view of the novel valve, shown mostly in cross section.

Referring now to FIG. 2, valve assembly 20 has a valve 22 disposed to enable flow of air and other gases into and out of the open interior 16 through conduit 18, and to oppose flow of liquid into conduit 18 past valve 22. Valve 22 is a spherical float having a density less than that of the liquid it is intended to exclude from conduit 18. In most cases, this liquid will be water, and the density of valve 22 is, obviously, less than that of water. A second spherical float 24 is provided to increase buoyant force acting on valve 22 in the event flood waters (see FIG. 3) rise around vault 10.

Valve 22 and float 24 occupy a chamber 26 formed in a valve housing 28. Housing 28 has a generally cylindrical lateral wall 30 surrounding chamber 26. A first opening 32 is located at one end of chamber 26 or wall 30. Opening 32 establishes fluid communication between chamber 26 and conduit 18. A valve seat 34 is formed at the upper wall of valve housing 28 between chamber 26 and first opening 32. Valve seat 34 is configured to cooperate closely with valve 22. Close cooperation establishes an effective seal closing opening 32 to chamber 26 when valve 22 is urged against valve seat 34, as occurs during flooding.

A second opening 36 is located at the other end of chamber 26 or wall 30. Opening 36 is the free end of conduit 18, or of the combined assembly wherein conduit 18 terminates at valve assembly 20. The free end of conduit 18 opens downwardly, so that rising water (see FIG. 3) will be constrained to act on float 24 and hence valve 22. Opening 36 is occupied by a grate or screen 38, which acts in the capacity of a retainer retaining valve 22 and float 24 within chamber 26. Given that opening 36 opens downwardly, when valve assembly 20 is assembled to vault 10 as shown in FIG. 1, screen 38 prevents escape of valve 22 and float 24 from chamber 26. Screen 38 has a plurality of openings 40 communicating between chamber 26 and the exterior of chamber 26. Each opening 40 is small enough to prevent passage of valve 22 and float 24 to the exterior of chamber 26. The number of openings 40 assures that there is adequate cross sectional area for migration of air into and out of interior 16 of receptacle 12. It will be appreciated that vault 10 may be either partially buried, as illustrated in FIG. 1, or completely buried (not shown). In the latter case, conduit 18 preferably extends above ground to enable unobstructed migration of air into and out of interior 16.

Valve assembly 20 is connectable to conduit 18 by virtue of close interfit and suitable fastening. If fabricated from metal, then conduit 18 and valve housing 28 may be threaded (not shown) to enable ready connection. Alternatively, conduit 18 and valve housing 28 may be fabricated from polyvinyl chloride piping components, which are readily available from retail and wholesale commercial distribution outlets. Such components are fabricated to interfit closely and are conventionally fastened by solvent or gluing compounds provided for this purpose. These or any other suitable method may be employed to connect valve housing 28 to conduit 18 at opening 32 of housing 28. Connection of conduit 18 to housing 28 is performed in a manner assuring sealing such that fluid flow into and out of conduit 18 must pass through valve assembly 20, so that flow may be appropriately controlled by valve 22.

FIG. 2 depicts a first position of valve 22 and float 24, this position being representative of the normally open condition of valve assembly 20, wherein gravity draws valve 22 and float 24 downwardly, where they come to rest on screen 38. In this position, first opening 32 is open, and air can migrate either into or out of interior 16 unobstructed. Air flow into interior 16 is depicted by arrows in FIG. 2. However, should ambient and internal pressure conditions vary, flow of air from interior 16 in a direction opposite that illustrated could easily occur, as would be represented by reversing the arrows as depicted.

As will be discussed hereinafter, valve 22 and float 24 move responsive to rising water entering chamber 26. To enable free movement both as water rises and as water falls, valve assembly 20 has the following characteristics. One is that valve 22 and float 24 are spherical. Another is that chamber 26 is essentially cylindrical, with first opening 32 and second opening 36 located at opposing ends of cylindrical chamber 26. A further characteristic is that every diameter (shown representatively at 42) of valve 22 is greater than half of diameter 44 of chamber 26. This characteristic assists in preventing valve 22 from becoming pinned in an effective location within chamber 26 by float 24 when rising water causes float 24 to rise. This relationship is supplemented by dimensions and configuration of that end of chamber 26 containing valve seat 34 so arranged to promote self-centering of valve 22 within chamber 26, thereby assuring successful seating of valve 22 during flooding.

Still another characteristic is that every diameter of float 24 is greater than diameter 42 of valve 22. This relationship assures that float 24 will exert considerably greater buoyant force on valve 22 should rising water enter chamber 26 than would be exerted merely by buoyancy of valve 22. Increasing the size of valve 22 would be marginally effective at best in increasing buoyant force, since with greater diameter of valve 22, valve seat 34 would be correspondingly larger. The novel arrangement assures that for any given dimensions of valve seat 34, buoyant force brought to bear by float 24 will exceed that naturally developed by valve 22, so that valve 22 will be effectively held in sealing relationship to valve seat 34 at all times. This concept was tested repeatedly in the spring of 1998 in actual installations in Florida and Louisiana, when heavier than normal rainfall inundated many telephone company operated battery vaults. In twenty-one individual installations, no battery vault was penetrated by flood waters which rose above the vent valve of a submerged vault.

Figure 3:
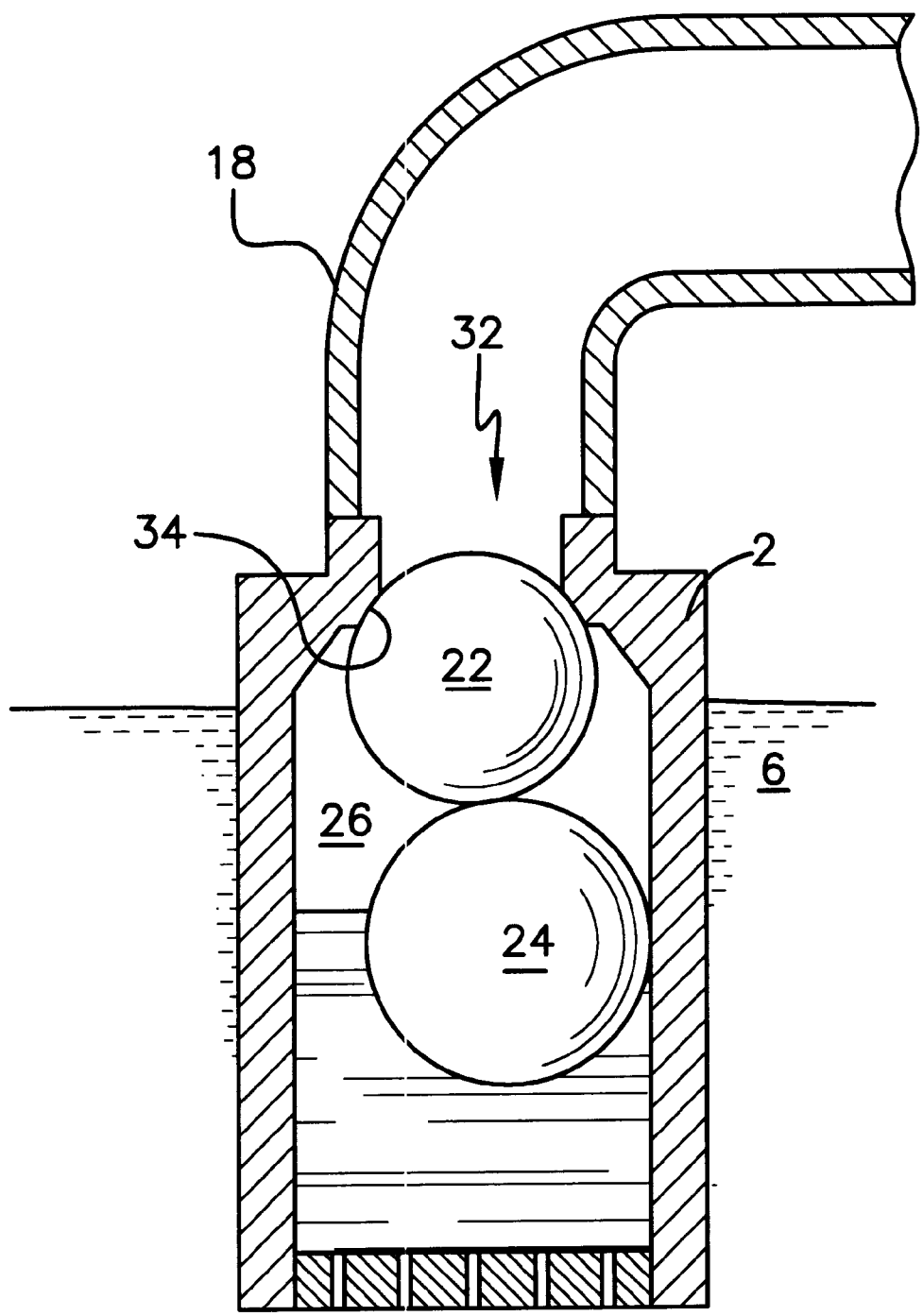
FIG. 3 is an environmental view similar to FIG. 2, but showing closing of the valve responsive to rising water entering the valve.

FIG. 3 illustrates a second position of valve 22 and float 24 within valve assembly 20, wherein valve 22 is urged into a sealing relationship relative to first opening 32. Rising water 6 has caused float 24 to urge valve 22 firmly against valve seat 34, thereby closing opening 32. It will be appreciated that even though chamber 26 is wider than valve 22 and float 24, valve 22 is successfully seated. This occurs because valve 22 and float 24 are vertically arrayed relative to one another. Of course, float 24 is slightly laterally displaced from true vertical alignment. However, the amount of displacement is so limited by relative dimensions of float 24 and chamber 26 that valve 22 will always be substantially above float 24 under even the most adverse conditions when flooding occurs.

The invention may be employed in environments other than that set forth herein. With appropriate changes to constituent materials and other details of construction, the invention may be applied to situations wherein any liquid is to be excluded from a vault or other receptacle or container in any gaseous atmosphere.

It is to be understood that the present invention is not limited to the embodiments described above, but encompasses any and all embodiments within the scope of the following claims.

I claim:

1. A valve assembly suitable for enabling gases to flow in opposing directions in a conduit disposed within a surrounding gaseous atmosphere and excluding a liquid from entering the conduit past said valve assembly from outside the conduit, said valve assembly comprising a valve housing forming a chamber therein, said chamber having a first opening and a second opening, whereby said valve assembly is connectable to the conduit at said first opening to control flow into and out of the conduit, and said second opening communicates with the atmosphere surrounding the conduit, a float valve movably disposed within said chamber, and a float member movably disposed within said chamber, said float member having a density less than that of the liquid being excluded from the conduit, wherein said float valve is disposed selectively in a first position opening said first opening in a non-buoyant condition and in a second position wherein said valve is in a sealing relationship relative to said first opening in a buoyant condition, and a retainer retaining said float valve and said float member within said chamber and allowing free flow through said chamber, wherein the density of said float valve is less than that of water, and the density of said float member is less than that of water, wherein said float valve and said float member are in continuous contact with one another in all positions.

2. The valve assembly according to claim 1, wherein said valve and said float are spherical.

3. The valve assembly according to claim 2, wherein said chamber has a generally cylindrical lateral wall, said first opening is located at one end of said cylindrical lateral wall, and said second opening is located at the other end of said cylindrical lateral wall.

4. The valve assembly according to claim 2, wherein said valve has a diameter greater than half of that of said chamber.

5. The valve assembly according to claim 1, wherein said float has dimensions greater in magnitude than those of said valve.

6. The valve assembly according to claim 1, wherein said retainer has a plurality of openings communicating between said chamber and the exterior of said chamber, wherein each said openings are small enough to prevent passage of said valve and said float to the exterior of said chamber.

7. The valve assembly according to claim 1, wherein said chamber has a valve seat disposed between said chamber and said first opening, wherein said valve seat is configured to cooperate closely with said valve, thereby establishing an effective seal closing said first opening to said chamber when said valve is urged against said valve seat.

8. A valve assembly suitable for enabling gases to flow in opposing directions in a conduit disposed within a surrounding gaseous atmosphere and excluding a liquid from entering the conduit past said valve assembly from outside the conduit, said valve assembly comprising a valve housing forming a chamber therein, said chamber having a generally cylindrical lateral wall, a first opening and a second opening, whereby said valve assembly is connectable to the conduit at said first opening to control flow into and out of the conduit, and said second opening communicates with the atmosphere surrounding the conduit, a spherical valve movably disposed within said chamber, and a spherical float movably disposed within said chamber, said valve and said float each having density less than that of the liquid being excluded from the conduit, wherein said float has dimensions greater in magnitude than those of said valve, said valve has a diameter greater than half of that of said chamber, and said valve is disposed selectively in a first position opening said first opening in a non-buoyant condition and in a second position wherein said valve is in a sealing relationship relative to said first opening in a buoyant condition, wherein said first opening is located at one end of said cylindrical lateral wall, said chamber has a valve seat disposed between said chamber and said first opening, wherein said valve seat is configured to cooperate closely with said valve, thereby establishing an effective seal closing said first opening to said chamber when said valve is urged against said valve seat, and said second opening is located at the other end of said cylindrical lateral wall, and a retainer retaining said valve and said float within said chamber and allowing free flow through said chamber, wherein said retainer has a plurality of openings communicating between said chamber and the exterior of said chamber, and wherein each said openings are small enough to prevent passage of said valve and said float to the exterior of said chamber, wherein said float valve and said float member are in continuous contact with one another in all positions.

9. The vault according to claim 8, wherein said valve assembly comprises a chamber formed within said conduit and a valve and a float vertically arrayed within said chamber, wherein said valve closes said conduit when urged upwardly, and said float increases buoyant force acting to urge said valve upwardly to close said conduit.

10. The vault according to claim 9, wherein said chamber is utilized in a vault for burial in the around and has a free end opening downwardly when said receptacle is at least partially buried in the ground.

11. The vault according to claim 10, wherein said free end of said chamber is closed by a member having a plurality of openings communicating between said chamber and the open atmosphere.

* * * * *